R. G. KNORR.
CORN PLANTER ATTACHMENT.
APPLICATION FILED AUG. 11, 1919.

1,366,915.

Patented Feb. 1, 1921.

Inventor
R. G. Knorr.
By Chandler & Chandler
Attorneys

UNITED STATES PATENT OFFICE.

ROYAL G. KNORR, OF CHADWICK, ILLINOIS.

CORN-PLANTER ATTACHMENT.

1,366,915.     Specification of Letters Patent.     Patented Feb. 1, 1921.

Application filed August 11, 1919. Serial No. 316,737.

*To all whom it may concern:*

Be it known that I, ROYAL G. KNORR, a citizen of the United States, residing at Chadwick, in the county of Carroll, State of Illinois, have invented certain new and useful Improvements in Corn-Planter Attachments; and I do hereby declare the following to be a full, clear, and exact description of the invention, such as will enable others skilled in the art to which it appertains to make and use the same.

This invention relates to new and useful improvements in attachments for corn planters.

The principal object of the invention is to provide a novel and improved attachment for a corn planter which will leave a ridge in the soil instead of a groove, thereby preventing rains from washing out the grains of corn.

Another object of the invention is to provide a novel and improved attachment for a corn planter which can be easily and quickly applied to the ordinary planter frame without modifications thereto, and which will be capable of adjustment toward and away from the ground as well as to perform the act of leveling the ground.

Other objects and advantages will be apparent from the following description when taken in connection with the accompanying drawings.

Figure 1:
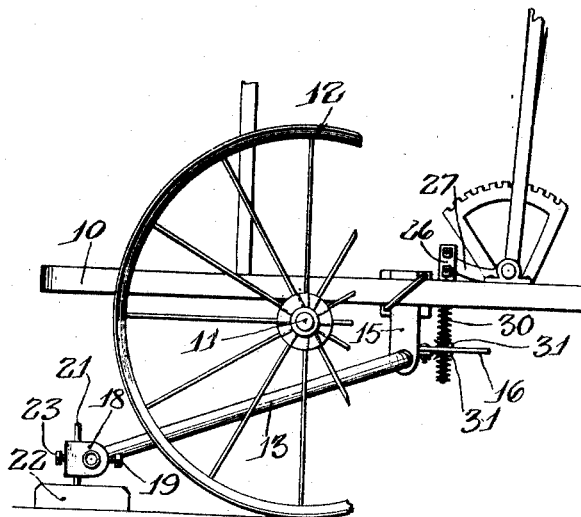
Figure 1 is a side elevation of a portion of a corn planter showing my invention applied thereto, one wheel being partly broken away.
Figure 2:
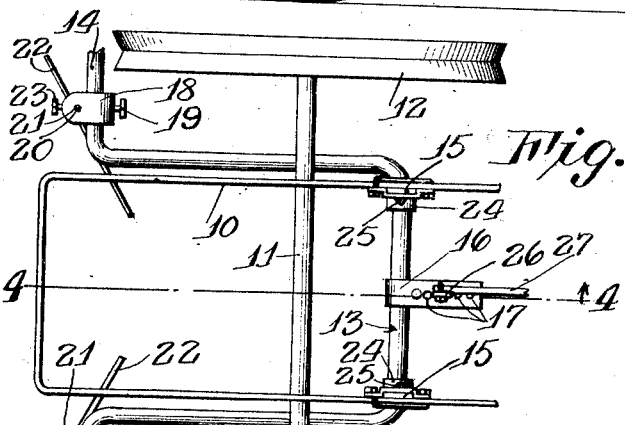
Fig. 2 is a top plan view of the same.
Figure 3:
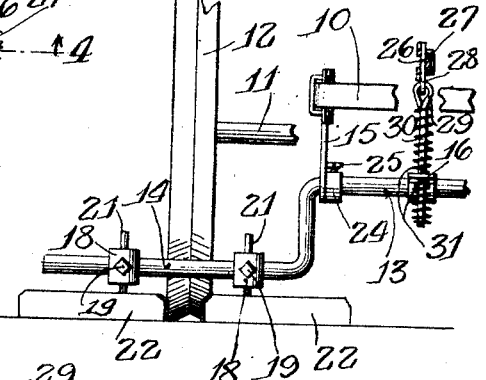
Fig. 3 is a rear elevation of the same.
Figure 4:
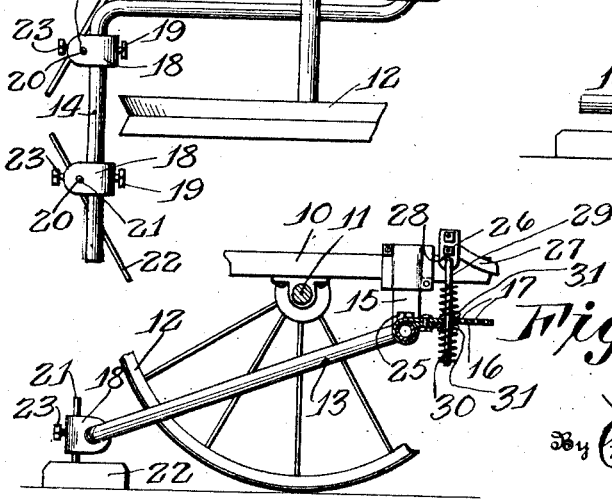
Fig. 4 is a vertical longitudinal sectional view taken on the central line 4—4 of Fig. 2.

Referring particularly to the accompanying drawings; 10 represents the planter frame, 11 the axle, and 12 the ground engaging marking wheels mounted on the ends of the axle. Disposed below the rear portion of the frame 10 is a yoke member 13, the rear ends of the arms of which are extended horizontally in opposite directions, as shown at 14, said portions 14 being arranged in positions transversely of and rearwardly of the wheels 12. The arms of the yoke incline downwardly and rearwardly, as shown in the drawings, Fig. 1, the transverse member of the yoke being connected to the frame 10 by means of the clips 15. The said transverse portion of the yoke is mounted for swinging movement on said clips, and rigidly secured to the intermediate portion of the transverse member, and extending horizontally forwardly therefrom, is a member 16 having a longitudinal series of openings 17. Slidable longitudinally on the members 14 are the blocks 18, and each of said blocks is provided with a screw 19 for holding the block in different longitudinally adjustable positions of the member 14. Each block has a vertical opening 20 in which is slidable the stem 21 of the scraper 22, a screw 23 being also provided for holding the stem in different vertical adjusted positions. It will be noted that there are two of these blocks 18 on each member 14, and that each has a blade or scraper 22 adjustable therein, and further, that the scrapers are disposed obliquely to the rear of the ground wheels 12. Collars 24, held by means of the set screws 25, are disposed on the transverse portion of the yoke 13 to hold the clips 15 in proper position thereon. A clamp 26 is secured to the operating lever 27, of the planter, and has an eye 28 which receives the eye 29 of the pin 30. This pin 30 is disposed vertically in one of the openings 17 of the member 16, and disposed through this pin, above and below the member 16, are the cotter pins 31, for holding the pin against vertical slidable movement in said opening. When the planter lever is moved on its pivot, motion will be transmitted through the engagement of the pin 30 with the member 16, and cause the rocking movement of the yoke in the clips 15, with the result that the scrapers will be raised from or lowered into engagement with the ground.

By rotating the stems of the scrapers in the blocks, and also by rotating the blocks on the members 14, the scraper blades can be set at different angles with respect to the ground so as to form a ridge of soil along the row, or scrape the soil level with the remaining portions of the ground adjacent the row.

What is claimed is:

1. A scraping device consisting of a yoke adapted to be mounted on the planter frame for rocking movement and to incline downwardly, the arms of the yoke having horizontally extending members secured transversely of the rear ends thereof, blocks slidable on the horizontal members, scraper blades adjustable vertically and rotatably on the said members, and means adapted to be connected with the yoke and the operating lever of the planter for rocking the yoke.

2. A scraping attachment for a planter comprising a yoke formed for swinging attachment to a planter frame, scraping blades carried by the ends of the arms of the yoke, a stationary bracket adapted for attachment to a planter frame, an arm carried by and extending horizontally from the intermediate portion of the yoke, a vertical rod connected with the bracket and disposed slidably through the arm, a spring encircling the rod above the arm, and resting with its lower end thereon, the upper end of the spring being held against upper movement on the rod, and a spring encircling the rod below the arms, the upper end of the spring bearing against the arm and the lower end of the spring being held against downward movement on the rod whereby the yoke is held resiliently in contact with the ground.

In testimony whereof, I affix my signature, in the presence of two witnesses.

ROYAL G. KNORR.

Witnesses:
HENRY H. STRAWSER,
WILLIAM A. CLARK.